United States Patent [19]

Drouet et al.

[11] Patent Number: 5,254,829
[45] Date of Patent: Oct. 19, 1993

[54] USE OF A PLASMA TORCH TO OPEN A TAP HOLE IN A METAL FURNACE

[75] Inventors: Michel G. Drouet, St Bruno; Jean Meunier, Greenfield Park; Hyun K. Choi, St. Lambert, all of Canada

[73] Assignee: Hydro Quebec, Montreal, Canada

[21] Appl. No.: 622,603

[22] Filed: Dec. 5, 1990

[51] Int. Cl.$^5$ .................. H05H 1/00; B23K 9/00
[52] U.S. Cl. .................. 219/121.39; 219/121.59; 266/271; 266/45; 266/67; 373/166
[58] Field of Search .............. 219/121.39, 121.49, 219/121.36, 121.59, 121.44, 121.48; 266/271, 45, 67, 88, 242; 110/349; 75/10.22; 373/166

[56] References Cited

U.S. PATENT DOCUMENTS

| | | | |
|---|---|---|---|
| 940,561 | 11/1909 | Seward | 266/271 |
| 1,186,358 | 6/1916 | Witz | 266/271 |
| 3,667,748 | 6/1972 | Dienenthal et al. | 266/271 |
| 3,818,174 | 6/1974 | Camacho | 219/121 P |
| 4,037,828 | 7/1977 | Terada et al. | 266/271 |
| 4,289,949 | 9/1981 | Raaness et al. | 219/121 PR |
| 4,335,265 | 6/1982 | Roberge et al. | 266/271 |
| 4,549,065 | 10/1985 | Camacho et al. | 219/121 PM |
| 4,559,439 | 12/1985 | Camacho et al. | 219/121 PM |
| 4,678,888 | 7/1987 | Camacho et al. | 219/121 PW |

FOREIGN PATENT DOCUMENTS

| | | | |
|---|---|---|---|
| 245603 | 2/1961 | Australia | 266/45 |
| 2539942 | 7/1984 | France | |
| 468068 | 12/1951 | Italy | 266/271 |
| 45-37408 | 7/1970 | Japan | 266/271 |
| 2-217173 | 8/1990 | Japan | 219/121.44 |

OTHER PUBLICATIONS

*Patent Abstracts of Japan*, vol. 14, No. 407, Sept. 4, 1990, JP 2,155,575, Komatsu Ltd., Jun. 14, 1990.

*Primary Examiner*—Bruce A. Reynolds
*Assistant Examiner*—John A. Jeffery
*Attorney, Agent, or Firm*—Foley & Lardner

[57] ABSTRACT

A water-cooled plasma torch specially designed to drill into a refractory material is used in a method for opening a tap hole closed by a plug in a wall of a furnace. This method which is particularly well adapted for robotization, includes the step of melting and breaking up the plug closing the tap hole by means of a jet of swirling gas of high speed and high temperature, generated by the plasma torch. The main advantage of this method is that the stream of plasma gas leaving the torch has a well defined outline ensuring precise and reproducible tapping of the plug and, as a result, efficient closing of the tap hole with a new plug after the furnace has been emptied.

15 Claims, 8 Drawing Sheets

USE OF A PLASMA TORCH TO OPEN A TAP HOLE IN A METAL FURNACE

BACKGROUND OF THE INVENTION

1. Field of the Invention

The present invention relates to a water-cooled plasma torch specially designed for use to drill into a refractory material.

The invention also relates to a method of using this specially designed plasma torch for opening a tap hole closed by a plug in a wall of a furnace, particularly a metal furnace, a blast furnace or an arc furnace.

2. Brief Description of the Prior Art

It is of conventional practice to provide one or more holes, called "tap holes", at the bottom of a blast furnace, an arc furnace or any other kind of metal furnace, in order to recover in a ladle the molten metal obtained after treatment within the furnace. The tap hole that is so provided in the wall of the metal furnace is usually of cylindrical form and used when the furnace is of rigid structure and cannot be tilted for pouring out the molten metal.

Of course, after each recovery of molten metal, it is necessary to stop the tap hole to avoid the slag on top of the liquid metal bath to pour out and mix with the metal in the ladle. This is usually done with a refractory plugging paste made of a mixture of clay, composed of alumina, silica and graphite. This plugging paste is extruded in the form of a roll which is inserted into the hole while it is extruded through a nozzle positioned in alignment with the hole to be stopped.

In order to achieve proper stopping of a tap hole, it is compulsory that the internal wall of the tap hole be properly calibrated so that the diameter of the plug-forming roll be identical to the diameter of the tap hole. Such a proper calibration involves that the opening of the tap hole after each operation of the furnace is made in a very precise manner.

Currently, there are four commonly used methods for opening tap holes in a furnace.

The first one consists in "drilling" the plug with a pneumatic drill. This method which is exclusively mechanical, has the advantages of not requiring water and drilling holes that are well calibrated. However, this first method has the drawback of being useful only when the tap holes are of limited depth, and only with moderate temperature. Moreover, the maintenance price of the equipment is very high because, in use, the bit at the end of the drill is usually destroyed or seriously damaged when it comes into contact with the molten metal.

The second method which is often used in combination with the first method disclosed hereinabove, consists in melting the plug with an oxygen lance. The lance which usually consists of a steel pipe, is inserted into the tap hole and a mixture of oxygen and iron powder is injected therethrough. The oxidation of the iron powder with the oxygen generates a substantial amount of heat which melts the plug. This second method is rather cheap but has the major drawbacks of resulting in a non uniform tapping because the reaction of iron with oxygen does not occur within the hole under a controlled fashion. As a result, cavities are generated in the wall of the tap hole, which substantially and negatively affects the calibration of it. Another drawback of this second method is that this lancing technique is almost impossible to automate.

The third method commonly used for opening tap holes, consists in melting the plug by means of an electric arc generated between a graphite electrode connected to the electrical supply of the furnace, and the plug itself. In practice, this third method is inefficient to open holes of a limited diameter especially when these holes are deep. Moreover, the material of the plug must be sufficiently conductive to permit arc transfer and the arc is never adequately directed As a result, the calibration of the hole is not respected.

The fourth method for opening tap holes consists in blasting the plugs with zinc balls. This fourth method is certainly well adapted to open tap holes in a very "clean" manner because the blasting effect is obtained by spontaneous vaporization of the zinc balls entering the tap hole. However the tap holes to be opened in this way must have a certain depth and be at high temperature before carrying out the blasting. In addition, there is a high risk of ricochets.

The uniformity and reproducibility of any tapping is important to keep the diameter of the tap hole well calibrated. The methods making use of an oxygen lance or an electrical arc transfer tend to enlarge the bottom of the hole because the heat is not directed and the dimension of the melting zone is not controlled. This in turn causes the new plug that is subsequently inserted, to be poorly held back and retained in the hole, thereby leading to major molten metal leaks that may be dangerous. It may also occur that the hole is so enlarged that it is not possible to stop the flow of metal with the plugging paste, thereby making it necessary to stop the furnace to repair the tap hole.

U.S. Pat. No. 4,289,949 assigned to SINTEF describes the above mentioned drawbacks of the commonly used methods for opening tap holes, and suggests to use a plasma burner to overcome the same. The plasma burner which is proposed in this patent, comprises a centrally arranged electrode and an outer electrode which are made of non-melting and subliming material constituting a continuously consumable system. The outer electrode is shaped as a pipe in which the other pipe or rod-shaped electrode is coaxially mounted. Means are provided to inject a gas through the annular passage between the electrodes up to the front ends of the electrodes where an electric discharge occurs from the end of the inner electrode.

The plasma burner disclosed in the SINTEF patent is principally designed for heating a metal melt. Although its application to open tap holes is disclosed in the specification, no example of such an application and test results are reported.

In practice, it is known that electrodes made of graphite or silicon carbide are particularly fragile and that the smallest knock on the electrodes can break the torch and make it inoperable.

It is also known that the use of two coaxial tubular electrodes does not permit to stretch the arc by increase of the gas flow, because the space between the electrodes remain the same and the working voltage is so low that the power transferred to the plasma gas is low too. Then, to obtain a significant power, the current must be very high and the erosion of the electrodes is important.

It is futher known that with two coaxial electrodes made of consumable material, it is not possible to obtain a plasma jet of well defined coaxial outline, although such is actually necessary to open tap holes in a precise and reproducible manner.

As a matter of fact, to the Applicant's knowledge, no plasma torch is currently available for use to open tap hole in a metal furnace. This is because none of the commercially available water-cooled torches is built for insertion into tap holes. Such an insertion of the torch inside the hole is necessary for melting plug to an important depth in order to reduce the drilling time and make it sure that the plug is molten in a precise manner. However, the majority of the commercially available torches cannot withstand the intense heat that exist within a tap hole. Accordingly, their insertion into a tap hole may result in water leak from their front sealing joints close to the fusion region.

Moreover, with the existing torches, there can be some deposit of molten material on the front electrode arc attachment point, causing irregular arc operation and shortening of the electrode life time.

SUMMARY OF THE INVENTION

An object of the present invention is to provide an improved water-cooled plasma torch whose structure is particularly well adapted to withstand extreme conditions of operation, like those encountered within a tap hole.

Another object of the invention is to provide a method of opening a tap hole closed by a plug in a wall of a furnace, which method makes use of this improved plasma torch and avoids most of the drawbacks of the known methods disclosed hereinabove.

The improved, water-cooled plasma torch according to the invention is principally developed to drill into a refractory material and is well adapted to open a tap hole on a metal furnace in a reproducible and precise manner. This torch has electrodes which are water-cooled and a tip which is designed in such a manner that the head of the torch can support very high temperatures without water leak.

More particularly, the plasma torch according to the invention has a main body in the form of a long cylinder made of stainless steel and covered with a layer of a refractory ceramic such an alumina, zirconia or magnesia deposited by plasma spraying. This layer plays an important role of thermal and electrical insulation. Indeed, it protects the internal components of the torch from the heat. Moreover, during the drilling process, this layer prevents the deposition of molten material on its surface. Thanks to this layer, the loss of heat via the water cooling system of the torch is reduced and the temperature inside the tap hole is higher, making it possible to evacuate the molten material more easily and to open the tap hole more quickly. When the stainless steel sleeve forming the body of the torch is at a higher electric potential than the plug, the ceramic layer is a good electrical insulator which prevents an arc to strike on its surface and damage the torch.

The front end of the torch which is designed to enter into the tap hole while the same is being opened, supports two coaxially aligned, hollow electrodes that are water cooled and preferably made of a copper alloy. These electrodes are connectable to a high voltage DC power supply. An electric arc is initiated by a high voltage pulse between the electrodes and the arc column is stretched by a strong vortex of gas that is injected into the central holes of the electrodes and heated by the arc at very high temperature.

The central hole of the front electrode is designed in such a way that the arc attachment point is near or at the tip of the torch for a given range of gas flow rate. To do so, the central hole of the forward electrode is shaped as a nozzle from which the plasma jet may go out with a well defined outline and an axial velocity high enough to prevent the deposition of molten materials on the region of the electrode where the arc is attached.

This high momentum plasma jet is able to melt and break up any refractory material in a very fast manner and to evacuate the droplets of molten materials with the leaving gas.

The torch according to the invention is advantageously designed in such a manner as to have only one O-ring seal for its water cooling system at the front end of the torch. This single O-ring is protected from the external heat by a pair of thin water channels extending on both sides thereof, and by the layer of ceramic plasma sprayed on the external surface of the cylinder. To that effect, the front electrode is designed in such a manner as to form the tip of the torch entering inside the tap hole and its outer diameter is selected to be slightly greater than the one of the main body so that the gas leaving the hole do not contact directly the zone where the O-ring is located.

A specially designed water circuit distributes evenly a strong demineralized water flow and ensures good cooling of the arc attachment region and the O-ring at the tip of the torch. Such a design also permits to remove quickly the front electrode for inspection of the O-ring and replacement of both electrodes in case of erosion.

Therefore, the improved water-cooled plasma torch according to the invention for use to melt and break up a plug in a tap hole of a furnace to open this tap hole in a reproductible and precise manner, is of the type comprising:

a hollow sleeve made of stainless steel, this sleeve having an external surface cylindrical in shape, and an open front end;

a pair of front and rear hollow electrodes coaxially mounted in line within the hollow sleeve, the front electrode being positioned at the front end of the torch, hereinafter called "tip" of the torch, and being provided with a central through-hole;

an electrically insulating spacing ring coaxially mounted between the hollow electrodes within the hollow sleeve;

means known per se extending within the hollow body for connecting the hollow electrodes to an external electric power source so as to generate between the electrodes an electric arc having an attachment point on each electrode;

means also known per se within the hollow sleeve and connectable to an external plasma-gas source having a given range of gas flow rate, for injecting a plasma gas into the electrodes between the same; and water conduit means connectable to an external water flow circuit for directing a flow of cooling water within the hollow sleeve all along the same up to the front end thereof in order to externally cool the front and rear electrodes and the spacing ring and also cool from the inside the external surface of the hollow sleeve.

In accordance with the invention, this plasma torch is improved in that:

it further comprises a protective covering consisting of a layer of ceramic material deposited by plasma spraying onto the external surface of the hollow sleeve;

the front electrode of the plasma torch has a front end provided with a cylindrical rearward portion sized to be fitted in to the front end of the hollow sleeve, and a cylindrical forward portion extending across the front end of the hollow sleeve, this cylindrical forward portion which forms the tip of the plasma torch and preferably has a front surface which is slightly conical in shape, being sized to extend radially and outwardly at a short distance away from the external surface of the hollow sleeve all around the same, whereby, in use, the plasma gas leaving the tap hole is slightly deflected and does not contact the front end of the hollow sleeve;

the central through-hole of the front electrode is sized and shaped to generate a jet of plasma gas of well defined outline and high axial velocity within the range of gas rate of the torch, in order to make it sure that the attachment point of the arc on the front electrode is near or at the tip of the plasma torch; the deposition of molten materials on this tip is prevented; and the momentum of the jet is sufficient to melt and break up the plug and simultaneously to evacuate the molten materials in a very fast and efficient manner, a single O-ring is provided at the front end of the torch to water seal the same, this single O-ring extending around the cylindrical rearward portion of the front end of the front electorde; and water channels opening into the water conduit means and forming an integral part thereof, are provided within the hollow sleeve and the rearward portion of the front end of the front electrode, respectively, these channels extending all around the single O-ring inwardly and outwardly thereof, respectively, and thus allowing sufficient cooling of the O-ring t o prevent it from being overheated.

The high temperature and high velocity of the plasma jet generated by the improved plasma torch according to the invention make it useful for drilling tap holes in a very short time.

Therefore, the invention also provides a method for opening a tap hole closed by a plug in a furnace, comprising the steps of melting and breaking up the plug closing the tap hole and simultaneously evacuating the molten materials being formed by means of the jet of swirling gas of high temperature generated by an improved plasma torch according to the invention.

Because the plasma jet of the plasma torch according to the invention has a well defined outline, the tap holes are opened in a very precise manner.

Plasma torches are tools that are known to produce a substantial flux of gas at very high temperature by means of an electrical arc generated between two electrodes. A full plasma torch equipment includes the plasma torch, an electrical power supply which is usually operated with DC current, a supply of plasma gas, a supply of cooling water for the torch, and a control panel.

One of the main advantages of the plasma torches is that they can be started and stopped instantaneously, and have no thermal inertia. As a result, when the torch is no more subjected to heat, its electric and water supplies can be stopped simultaneously without any damage to the torch.

As previously indicated, the plugs used to close the tap holes usually consist of a paste made up of a mixture of alumina (40%), silica (40%) and graphite (20%) which makes them electrically conductive at high temperature. When use is made of air as plasma gas as it is of common practice, the atomic oxygen contained in the plasma jet reacts with the graphite of the plug and causes combustion of the same, such combustion generating additional heat in substantial quantity. Chemical heating of the plug is thus important in the tapping step when use is made of a plasma torch. Of course, if use is made of pure oxygen as plasma gas instead of air, the melting speed of the plug will substantially be accelerated.

However, the fusion heat and melting temperature of the plugging paste are more important factors than the carbon content of this paste as far as the drilling speed is concerned. As a matter of fact, the plasma torch may even be used for drilling plugs containing no carbon. If the carbon content is greater than 20%, the melting point of the plug is increased and there will be too much carbon present for the combustion with air than is necessary, thereby significantly increasing the tap hole drilling time.

To accelerate melting of the plug as much as possible, the same may be heated by electrical conduction. As mentioned earlier, when the plug is heated at high temperature, it becomes electrically conductive. Accordingly, it becomes possible to strike an arc between the tip of the torch and the plug if the latter is connected to the electrical circuit of the torch.

For this purpose, according to a preferred embodiment of the invention, another arc may be superimposed to the arc generated by the plasma torch, by connecting the front electrode of the torch and an electrode in contact with the metal in the furnace to an auxiliary power source (AC or DC) which can be the electric power supply of the furnace.

According to another preferred embodiment of the invention the plasma torch can be electrically connected to the furnace as disclosed hereinabove in order to be operable in a hybrid mode, that is to say in a non-transferred arc mode as well as in an arc transferred mode. In such a case, when the torch is close enough to the plug, the plasma arc can be transferred to the plug.

If use is made of a powerful plasma torch and this torch has to be held in front of the hole during the tap hole opening because, for example, its diameter does not permit it to be inserted into the tap hole, the length between the tip of the torch and the plug will increase as the plug melts and breaks up, and a low voltage gas, like argon, then shall advantageously be added to the air or oxygen fed to the torch in order to reduce as much as possible the arc voltage.

In such embodiments, the transferred or auxiliary current passes through the plug and helps in melting the same by Joule effect. Moreover measurement of this transferred or auxiliary current can be used for the automatization of the process.

Automatization of the tap hole opening is a very important factor to operate the plasma torch in a very precise manner and to achieve reproducibility of the method. To do so, the plasma torch can be mounted on a guiding rail and moved forwards and backwards by means of an hydraulic jack or any similar means. Apart from features which are necessary to control the plasma torch operation (arc voltages, arc current and plasma gas flowrate), some other features can be used to control the process. These other features are as follows:

position (XY) and inclination (O) of the torch which must be adjusted so that the longitudinal axis of the torch precisely coincides with the longitudinal axis of the tap hole;

position (Z) of the tip of the torch with respect to the front surface of the wall of the furnace;

difference of temperature between the cooling water entering the torch and the same water leaving the torch, which can be monitored to detect any overheating of the torch when inserted within the tap hole, and used to command removal of the torch by a quick backwards motion as soon as such an overheating is detected;

intensity of the transferred current or the auxiliary current passing through the plug, this feature being useful to control the position of the tip of the torch with respect to the plug, to control the slow progression of the torch inside the tap hole, and also to detect the end of the process when the metal begins to flow.

All these data can be sent to a computer or a programmable automate capable of controlling the operation of the torch and its displacement during opening of the tap hole.

The use of the improved plasma torch according to the invention for opening tap holes advantageously permits to combine all the advantages of the known methods mentioned hereinabove and to allow easy robotization and automatization. When such a plasma torch is used, melting of the plug is achieved by impact of the very high temperature plasma jet, while the molten substances that are formed, are blown away by the gas of high velocity leaving the hole.

The main advantages of the method of opening a tap hole with the improved plasma torch according to the invention are as follows:

obtention of a plasma jet of well defined coaxial outline, allowing to melt and break up the plug without damaging the wall of the tap hole;

reproducibility of the method, allowing easy robotization;

easy and fast ejection of the molten substances by the high velocity jet of gas;

choice of the plasma gas to chemically burn the plugging paste containing graphite;

possibility of transfering the arc on the plug when the latter is sufficiently hot;

possibility of using plasma torches from 100 kW to 2.5 MW to fit the particular application;

excellent calibration of the hole being tapped, even if this hole is deep, without formation of cavities, because the plasma torch generates a highly localized plasma jet with all the necessary energy for melting and breaking up the plug, so that the plasma jet is never in contact with the surrounding walls during the operation.

The invention will be better understood upon reading of the following non-restrictive description of several preferred embodiments thereof, made with reference to the accompanying drawings.

BRIEF DESCRIPTION OF THE DRAWINGS

In these figures, the elements of similar use have been identified by the same reference numerals for the purpose of simplicity, even when these elements were sometimes of different structures and arrangements.

DESCRIPTION OF PREFERRED EMBODIMENTS OF THE INVENTION

Figure 1:
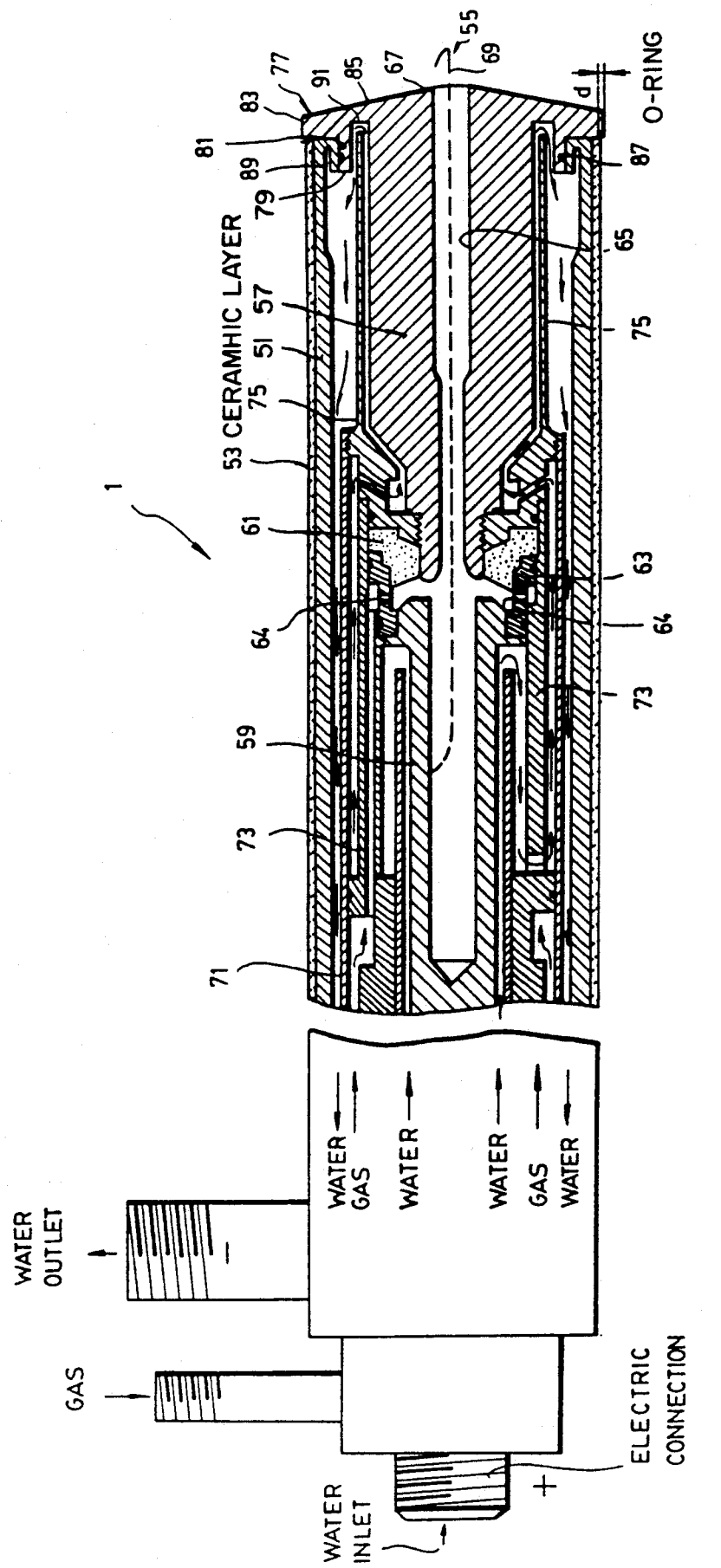
FIG. 1 is a longitudinal view in partial cross-section, of the front end of an improved plasma torch according to the invention.

FIG. 1 is a schematic representation in partial cross-section of an improved plasma torch according to the invention for use to open tap holes.

The torch 1 as shown in FIG. 1, is in the form of a cylinder that can be 2 meters long. It comprises an external hollow body or sleeve 51 that is made of a stainless steel and is covered by a layer of ceramic 53 applied by plasma spraying. This layer 53 acts as a good electrical and thermal insulator.

The front end 55 of the torch is designed to enter into the tap hole to be opened as will be explained hereinafter. This front end 55 contains two coaxially aligned hollow copper-alloyed electrodes 57, 59 that are water cooled and connected by means known per se to a high voltage power supply in such a manner as to be in reverse polarities. The front electrode 57 which acts as cathode, and the rear one 59 which acts as anode, are electrically insulated from each other by means of a ceramic insulator ring 61.

In the gap between the electrodes, a plasma gas is injected tangentially through holes 64 provided in a vortex generating ring 63 positioned adjacent the spacing ring 61, in order to generate a strong swirling stream in the central hole 65 of the front electrode 57.

In use, an electric arc is initiated between the electrodes 57 and 59 by a high voltage pulse and subsequently stretched by a strong vortex of gas which makes the attachment roots of the arc to rotate.

In accordance with an important feature of the invention, the central hole 65 of the front electrode 57 is shaped as a nozzle so that the front attachment point 67 of the arc column 69 is near the tip 55 of the torch for a given range of gas flow rate. The arc column 69 is shown in dotted lines in the FIG. 1. To avoid the arc root to attach on the same spot and then to increase the lifetime of the electrodes, the gas inlet pressure can be changed periodically within a given range.

Thanks to the nozzle shape of the central hole 65 of the front electrode 57, the plasma gas jet that goes out of the torch, has a well defined shape and outline and a high axial velocity. Such a velocity and the dynamic pressure of the jet protects the torch from the deposition of molten particles in the arc attachment zone during drilling into a refractory material.

In use, the high momentum plasma jet well defined in shape, makes it possible to melt and break up any refractory material in a very fast and precise manner, and to evacuate the droplets of molten materials which are transported away with the gas when the jet is escaping from the drilled hole.

As is known in this particular field, the electrodes 57, 59 and rings 61, 63 are mounted within the sleeve 51 in such a manner as to define in between a gap through which demineralized water may be circulated as is shown with arrows, along a circuit defined by a plurality of cylindrical partition or baffles 71, 73, 75 attached to each other and/or to the electrodes. Advantageously, these partitions may be shaped and connected as is known per se to direct the flow of cooling water within the torch from the rear end of the same up to the front end thereof and then back to the rear end in order to externally cool the rear electrode 59, the spacing and vortex generating rings 61 and 63 and the front electrode 57 first, and then the internal surface of the sleeve 51.

A particularly original feature of the improved, water cooled plasma torch according to the present invention is that its front electrode 57 has a front end 77 provided with a cylindrical rearward portion 79 that is sized to be fitted into the front end opening 81 of the sleeve 51. The front electrode 53 also has a forward portion 83 that extends across the front end of the sleeve and forms the tip 55 of the torch. This forward portion 83 preferably has a conical front surface 85 as is shown in FIG. 1, which is sized to extend radially and outwardly at a short distance "d" away from the external surface of the sleeve 51, all around the same, in order to deflect outwardly the hot gas leaving the tap hole and prevent them from contacting the front end of the sleeve 51.

Such a particular arrangement makes it possible to safely use a single O-ring 87 at the front end of the torch 1 to water seal the same. This single O-ring 87 is positioned into an external groove provided all around the rearward portion 79 of the front end 77 of the front electrode 57 and is protected from overheating by means of water channels 89, 91 opening into the cooling water conduit and consisting of annular slots made within the rear portion 79 of the front end 77 of the electrode 57, and the front end 81 of the sleeve 51, respectively, these slots being coaxial with the O-ring 87 and extending inwardly and outwardly thereof.

It is worth mentioning that this particular arrangement is particularly interesting for maintenance purpose, since it makes it possible to remove quickly and easily the front electrode 57 to inspect the O-ring 87 and electrodes 57, 59 and to have access to the other structural elements of the torch 1.

Figure 2:
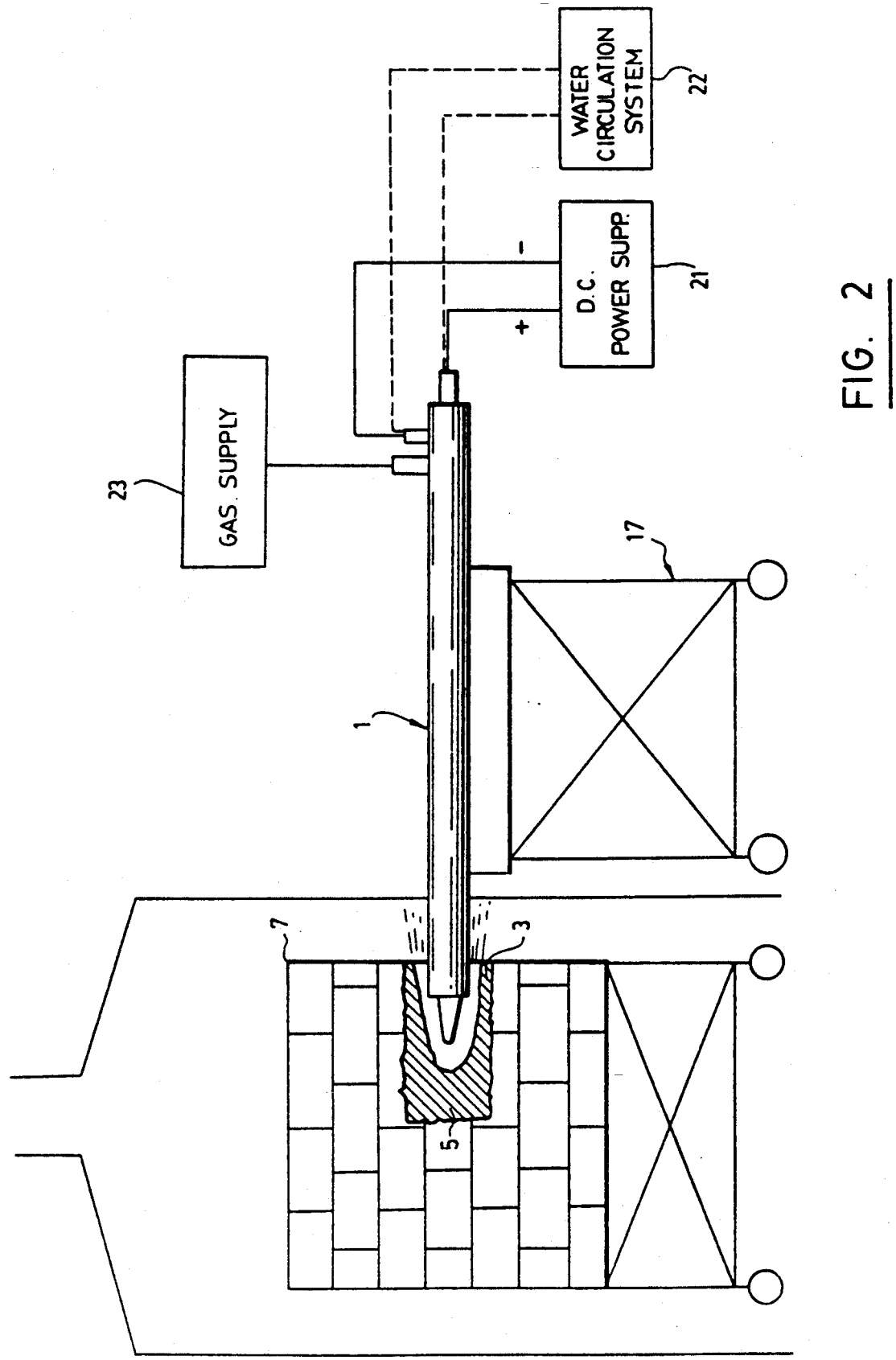
FIG. 2 is a schematic cross-sectional view of an experimental equipment used in lab by the Applicant to simulate the opening of a tap hole and to test the plasma torch shown in FIG. 1.

As is known in the art and shown in FIG. 2, the plasma torch 1 is used as part of a more complete plasma torch equipment including a DC electric power supply 21, an external water circulation system 22, a plasma gas supply 23, and a control panel (not shown).

FIG. 2 shows an experimental assembly that was used by the Applicant in laboratory to optimize the design of the torch 1, to test its reliability and to check its efficiency for opening a tap hole. These tests were carried out on plugs 5 similar to those used in the electric arc furnaces. Each plug 5 was enclosed in a hole 3 acting as a tap hole, drilled in a wall 7 made of high-density alumina bricks. The interface between the plug 5 and the bricks was cemented with a high density alumina mortar to make the resulting structure a close simulation of an actual furnace wall except that the inner side of the plug was not exposed to hot metal. For protecting the staff and equipments from the ejection of very hot molten particles, the wall 7 and torch 1 were installed inside a cabin and the fumes were evacuated through a ventilation unit.

The torch 1 was mounted onto an adjustable support 17 and coaxially positioned with respect to the longitudinal axis of the tap hole 3. The torch 1 was started and its power output as well as the flow of plasma gas fed to it, were adjusted to the specified level. In practice, the temperature of the plasma jet is around 5,000° C., i.e. twice the value of the melting temperature of the plug which is usually ranging between 2,000° C. to 2,500° C.

The torch 1 was slowly advanced towards the plug 5. When the head of the torch 1 was spaced in a few centimeters away from the plug 5, the latter started to melt and the molten particles carried by the high momentum plasma gas started to flow away in all directions. The torch 1 was then moved slowly forwards so as to enter inside the tap hole 3 and thus to continue melting and breaking up the plug 5.

It has been found that when the torch 1 is inside the tap hole, it must be withdrawn therefrom at regular intervals to allow the molten materials to be drained out of the hole and also to avoid an excessive overheating of the body of torch. If the torch stays too long at the same place within the tap hole, an excessive overheating of the internal wall of this hole may occur and result in an undesired enlargment of the diameter of the tap hole.

As a result, the insertion of the torch inside the hole must be made slowly and in a step-by-step manner. At the end of each insertion step, the head of the torch must be quickly removed from the hole and positioned in front of the outlet thereof to allow the jet of gas to blow out the molten material that has accumulated in the hole. Then the torch may be reinserted into the hole, back to its previous position, and its slow forwards motion inside the hole may be resumed. Tapping of the plug is thus carried out in an alternative back and fro movement of the torch 1 within the tap hole 3.

The temperature of the cooling water at the outlet of the torch is a parameter that can be used to determine when the torch has to be removed from the hole. It has been observed that when the head of the torch is inside the hole, the temperature of the cooling water at the outlet of the torch can increase by about 10° C., as compared to the temperature measured when the torch is placed in front of the hole. A preset temperature value may accordingly be determined to remove automatically the head of the torch from the hole in order to avoid an overheating of the structural elements of the torch and/or any damage to the wall of the hole.

In practise, almost one hundred tests were carried out. During these tests, plugs were molten and broken up in a rather fast manner, with great efficiency and with no damage being made to the internal wall of the tap hole.

The tests were carried under the following operating conditions:

| | |
|---|---|
| Plugging paste chemical composition: | 20% C, 40% Al$_2$O$_3$ 40% SiO$_2$ |
| Plasma torch power: | 100 kW |
| Arc current: | 200 A |
| Arc voltage: | 500 V |
| Torch efficiency: | 70% |
| Plasma gas flow: | 170-280 l/min |
| Diameter of the torch: | 7.5 cm |
| Length of the torch: | 200 cm |
| Diameter of the plug: | 8.9 cm |
| Depth being reached: | 20 cm |
| Mean operation time: | 9.2 min |
| Mean drilling speed: | 2.2 cm/min |
| Maximum temperature difference for cooling water: | 15° C. |

Tests which were performed on plugs bigger (5 inches in diameter) with a more powerful torch gave similar results:

| | |
|---|---|
| Plasma torch power: | 200 kW |
| Arc current: | 400 A |
| Arc voltage: | 500 V |
| Torch efficiency: | 70% |
| Plasma gas flow: | 500 l/min |
| Diameter of the torch: | 10 cm |
| Length of the torch: | 200 cm |
| Diameter of the plug: | 12 cm |
| Depth being reached: | 20 cm |
| Mean operation time: | 8.8 min |
| Drilling speed: | 2.2 cm/min |

The time necessary to open a tap hole is practically proportional to the amount of plug material to be melted and inversely proportional to the plasma jet power.

During these above tests, it took around 8 minutes to open the tap hole. It should be remembered however that, at the beginning of these tests, the plug 5 and wall 7 were at the room temperature. One may understand that, under standard conditions of operation in a furnace containing molten metal at a temperature higher than 1000° C., the time necessary to open a tap hole should substantially be reduced, probably to less than 5 minutes.

On a few tests, an iron plate was placed behind the plug 5 and connected to the power supply of the torch to verify the possibility to transfer the arc on the plug when the latter is heated. Those tests were successful and permitted to verify the good working of the plasma torch in the hydrid mode as will be explained hereinafter.

Figure 3:
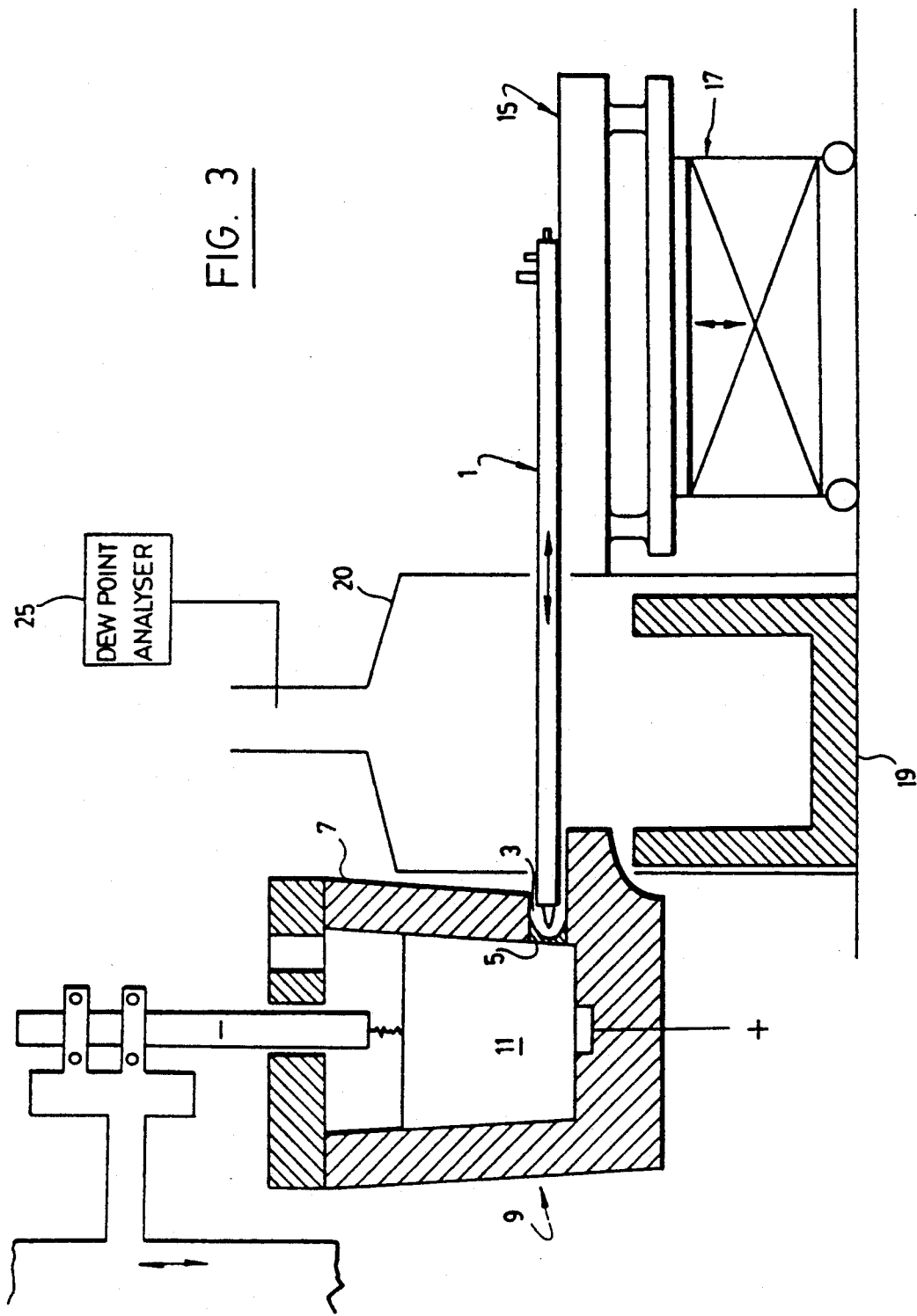
FIG. 3 is a schematic, cross-sectional view of another experimental equipment used in lab by the Applicant for opening a tap hole in a furnace containing one feet of liquid steel.

FIG. 3 shows another experimental assembly that was tested in lab. In this particular embodiment, the plasma torch 1 was actually used to open a tap hole 3 in the wall 7 of a metal furnace 9 filled with a bath 11 of molten steel. The torch 1 was guided axially by a hydraulically powered linear drive unit comprising a power beam 15 mounted on an hydraulically driven table or support 17.

A hole 3 having a 3.5 inches diameter was first drilled by the torch through the wall 7 of furnace 9. This wall comprised an outer, ¼ inch thick layer of steel, an intermediate, 4 inches thick layer of 90% alumina refractory and an inner, 3 inches thick layer of carbon. The hole 3 was plugged with the same plugging paste as used previously.

400 kg of steel was melted in the furnace 9, using an arc transfer technique to do so. The level of molten metal in the furnace was 14 inches high. Then, the torch 1 was started and the opening of the tap hole was carried out as disclosed hereinabove. After 3 to 5 minutes, the plasma flame touched the liquid metal bath 11. Some droplets of metal were expelled from the hole 3 with the gas leaving this hole, thereby showing that the plug 5 had completly been molten. Then, the torch was withdrawn from the hole to allow the molten steel to pour into a ladle 19.

During the process, the gas escaping from the torch 1 and hole 3 was collected within an exhaust hood 20 and monitored by a dew point analyser 25 to detect any water leak and to ring an alarm to stop the drilling process in the case of such a leak.

The operating conditions were as follows:

| | |
|---|---|
| Torch power: | 100 kW |
| Arc voltage: | 500 V |
| Arc current: | 200 A |
| Plasma air flow: | 170-280 l/min |
| Plug diameter: | 8.9 cm |
| Plug length: | 18 cm |
| Operation time: | 4 min |
| Drilling speed: | 4.5 cm/min |

As can be noticed, the drilling speed is increased by a factor of approximately two when liquid steel is present behind the plug 5 and heats the same.

FIGS. 4 to 8 are illustrative of different ways of carrying out the method according to the invention for opening a tap hole 3 in a metal furnace 9 with the improved plasma torch 1 disclosed hereinabove.

Figure 4:
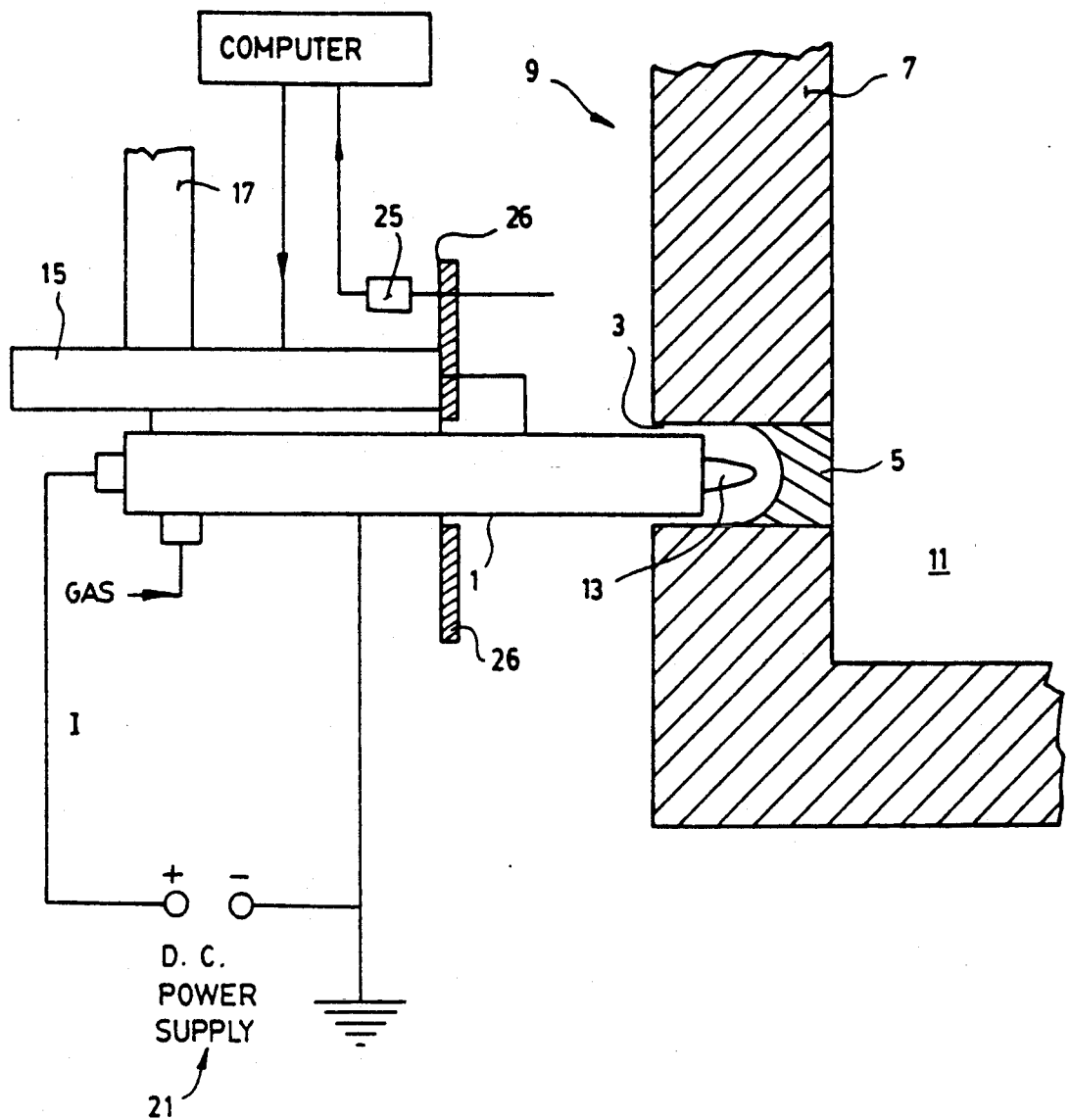
FIG. 4 is a schematic view of a plasma torch as shown in FIG. 1, used in a non-transferred arc mode, the torch being movable in translation within the hole to open the same.

FIG. 4 shows the plasma torch 1 working in a non-transferred arc mode for use to open a tap hole 3 closed by a plug 5 in a thick wall 7 (one foot or more) on a furnace 9 containing a molten metal bath 11. The torch 1 is coaxially positioned with respect to the longitudinal axis of the tap hole and connected to a D.C. power supply 21. This torch 1 which is cylindrical, is moved axially into the tap hole 3 as the plug is molten and broken up by the plasma jet 13 blown out of the head of the torch.

To do so, the torch 1 is fixed to a power beam 15 mounted on a support 17 that is adjustable to place the torch 1 in coaxial alignment with the hole. The power beam 15 may comprise a hydraulic jack or any similar means to move the torch along a guiding rail fixed to the support 17. A protection shield 26 can be placed on the power beam 15 to protect the staff around and the tubings feeding the torch from the heat and projection of molten particles. Usually three tubes are connected to the torch 1: one for the input of electricity and water; one for the output of electricity and water; and one for the gas supply.

Tapping of the plug is carried out in an alternative back and fro movement of the torch 1 within the tap hole 3 as was explained earlier. When the plug 5 is fully molten, a small amount of liquid metal begins to flow into the space between the external surface of the torch 1 and the wall of the tap hole 3 and results in projection of droplets of metal carried away by the leaving plasma gas. At that time, the pressure exerted by the plasma flame 13 protects the head of the torch 1 from the molten metal and acts as a gaseous plug which maintains the molten metal inside the furnace.

The torch 1 is then removed quickly from the hole 3, to allow the liquid metal to pour out of the furnace.

As the plasma torch is water cooled, the risk of a spill of water on the tapping track may exist. As it was explained hereinabove, a great effort has been made on the design of the tip 55 of the torch 1 in order to avoid such a water leak and more than 30 tests were successively carried out with the same torch in lab without any problem. It has also been found that the erosion of the electrodes was acceptable, its estimated working time with a same couple of electrodes being of about 100 hours.

In use, a periodical check has to be made to observe the wear of the electrodes. However, the risk of a spill is minimal because, at the beginning, the water leak if any would be quite small and because water, in such a case, would almost instantaneously be transformed into vapor because of the very high temperature of operation of the torch 1.

As explained hereinabove, a device 25 may be provided to analyze in a quasi-permanent manner, the composition of the gas escaping from the tap hole and to detect therein the eventual presence of water vapor indicative that there is a water leak in the cooling system of the torch. When such a device is used and a water leak is detected, the torch must be quickly removed from the hole and the water and electric power supplies must be switched off instantaneously. Of course, this can be made automatically in response to some signal from the device 25.

Figure 5:
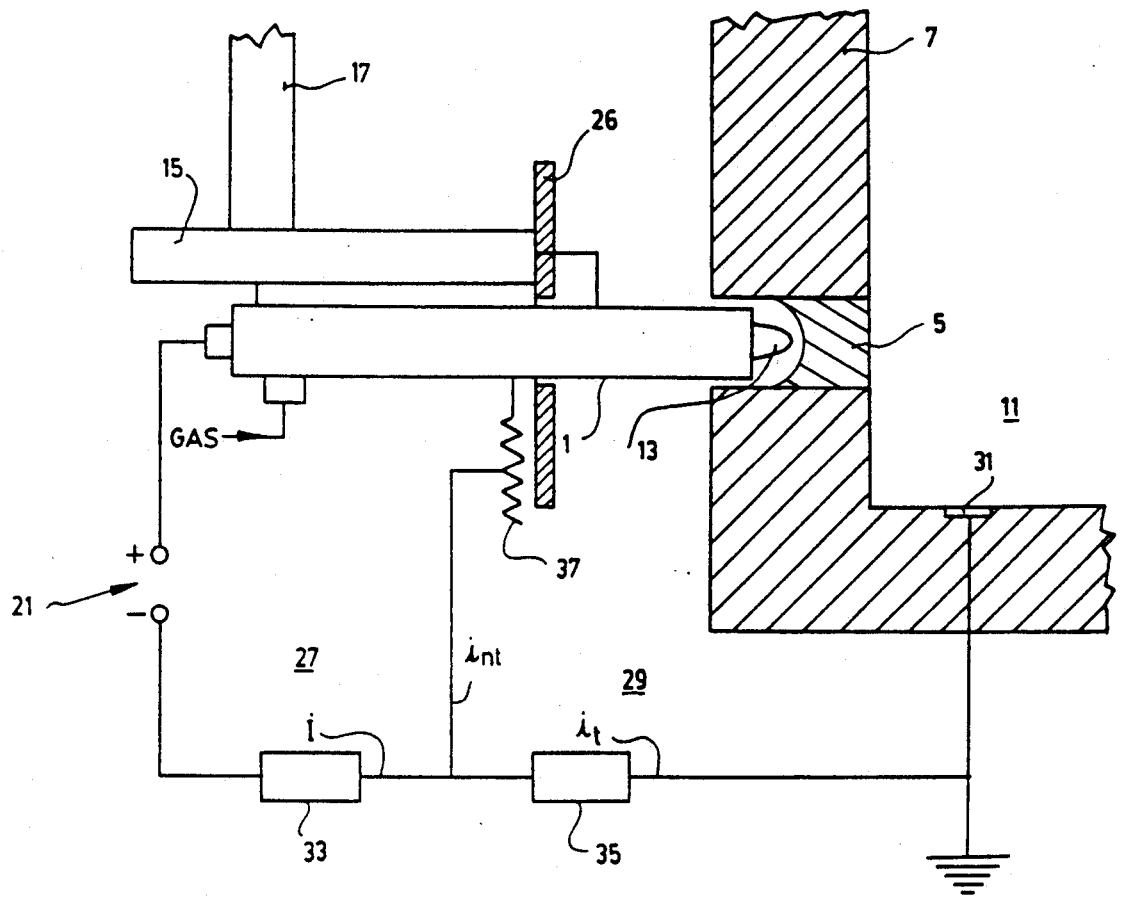
FIG. 5 is a view similar to that FIG. 3, showing a plasma torch as shown in FIG. 1 working in a hybrid mode, the torch being movable in translation within the hole to open the same.

FIG. 5 shows an arrangement very similar to the one shown on FIG. 4, except that the plasma torch is connected in the hybrid mode, so as to operate in both non-transferred and transferred arc modes. For this reason, the various structural elements that are shown in this figure and are similar to elements already shown in FIG. 4, have been identified with the same reference numerals.

The plasma torch 1 of this other embodiment is connected to a DC power supply 21 and comprises a first sub-circuit 27 with a variable water cooled resistance 37 to operate the plasma torch 1 in its non-transferred mode and a second sub-circuit 29 including the plug 5, the liquid metal bath 11 and an electrode 31 in contact with the metal in the furnace to operate the torch 1 in its transferred mode. The purpose of the resistance is to help the transfer of the arc on the plug and its typical value is 0.5 ohm.

The total current I from the power supply subdivides into a non-transferred current $i_{nt}$ flowing through the resistance 37 and a transferred current $i_t$ flowing via an transferred arc through the plug 5.

The torch 1 is operated the same way as in FIG. 4 but here the values of the currents $i_t$ and $i_{nt}$ can be measured at 33 and 35 respectively, and used to control the axial displacement of the torch 1. These measurements of current are instantaneous as compared to any measurement that can be made of the temperature of the cooling water which measurement has a response time of about one second in the detection of an overheating of the torch head. Of course, the values of $i_t$ and $i_{nt}$ depend on the position of the torch head with respect to the plug. When the torch 1 is far from the plug 5, $i_t=0$ and $I=i_{nt}$; when it is close to the plug, it $i_t \neq 0$. Typical values during tests for a total current of 400 A were $i_t=100$ A and $i_{nt}=300$ A.

In use, the torch 1 is moved forwards toward the plug 5, eventually inside the hole 3, until a transferred current $i_t$ is detected. Then, it is further pushed forward slowly to adjust and keep the transferred current $i_t$ to its maximum value. When the temperature of the cooling water at the outlet of the torch 1 reaches its maximum preset value of, say, 30° C. for a temperature of 15° C. at the inlet, the torch 1 is removed quickly from the hole and positioned in front of the hole to allow the plasma jet to blow out of the molten material that has accumulated inside this hole. At that moment, the torch is working only in the non-transferred arc mode because the head of the torch 1 is too far from the plug 5. After a few seconds or when the outlet cooling water temperature comes back to, say, 25° C., the torch 1 is reinserted to its last position and its forwards motion is resumed and controlled by the measurement of the transferred current $i_t$. When the plug is completely molten, the transferred arc contacts the liquid metal and the transferred current $i_t$ reaches a high value which can be used as a signal to remove the torch 1 quickly from the hole and to end the process.

This method for opening a tap hole is particularly well adapted for automatization but it is worth mentioning that a large part of the electric energy supplied to the torch is lost in the cooled resistance 37. Moreover, the time necessary to open the tap hole is substantially longer than when use is made of the method of FIG. 4.

Figure 6:
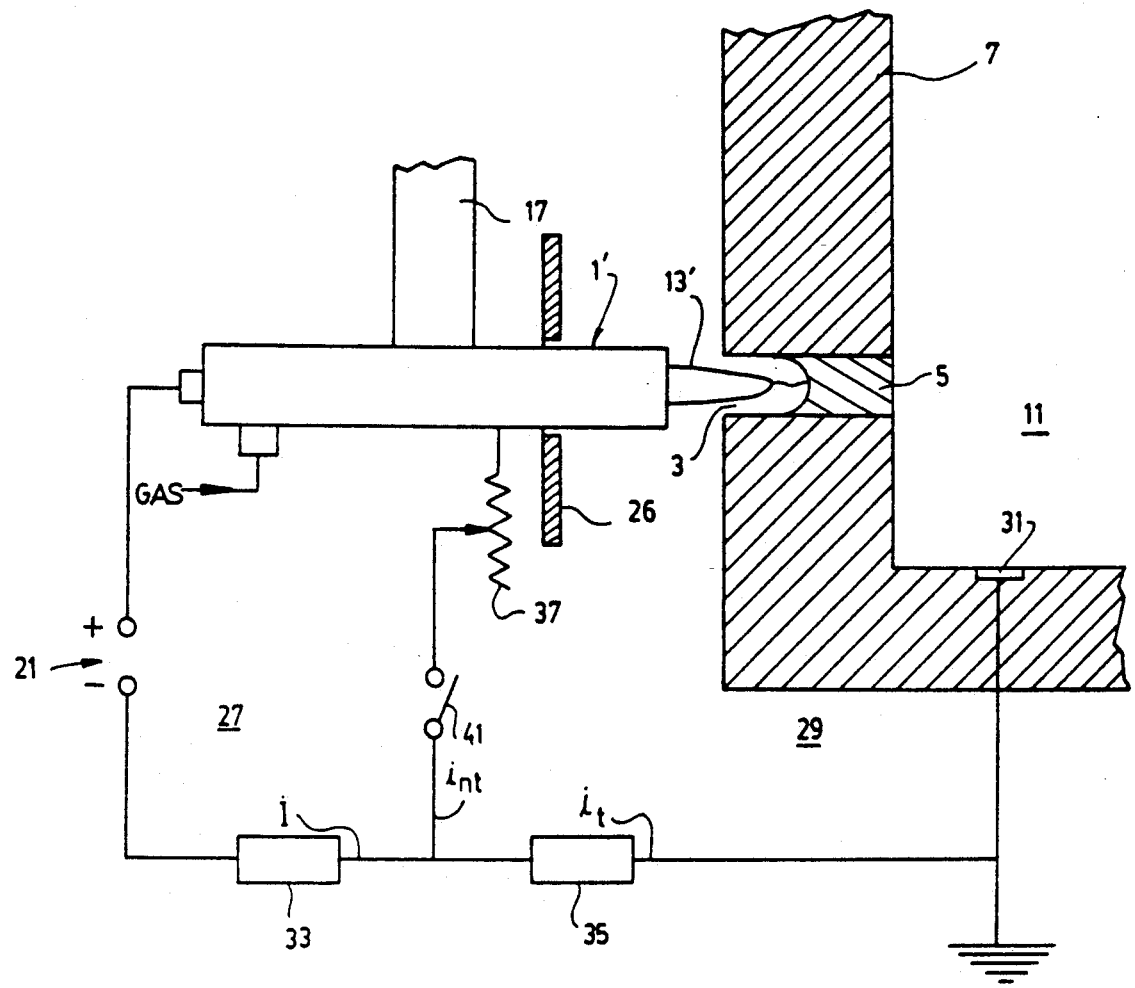
FIG. 6 is a schematic view of a high power plasma torch according to the invention working in the hydrid mode, the plasma torch being placed in front of the tap hole and staying fixed during the process.

FIG. 6 shows another embodiment making use of a high power (2.5 MW) plasma torch 1' working in the hybrid mode, as was explained in FIG. 5. In this particular embodiment, the diameter (16 cm) of the torch 1' is greater than the one of the plug 5. As a result, the torch 1' cannot be inserted inside the hole 3. With such a torch 1', the plasma jet 13' is axially longer than the one of the low power plasma torch 1 but, in use, it becomes nevertheless necessary to transfer the arc on the plug 5 to complete melting of the same.

At the beginning, the torch 1' is positioned in front of the tap hole 3 and it remains fixed in this particular position during the whole process. This embodiment is particularly advantageous in that it limits the thermal stress applied to the head of the torch 1'. Indeed, in this particular case, melting and breaking up of the plug is essentially achieved by increasing the length of the arc.

In use, the torch 1' is started and placed a few centimeters away from the center of the plug 5 which begins to melt. As the plug 5 is heated, it becomes more conductive and the arc begins to transfer on the plug. As soon as a transferred current $i_t$ is measured at 35, a switch 41 is opened to disconnect the resistance 37. Then the torch 1' is only working on the transferred arc mode. At that time, no more power is lost in the resistance 37 and all the current delivered by the DC power supply 21 is flowing through the plug which is efficiently heated by conduction.

As the plug melts and the molten material is removed by the high momentum plasma jet, a progressive lengthening of the arc occurs. To allow such a lengthening of the arc, use can be made of a mixture of argon and oxygen as plasma gas.

Figure 7:
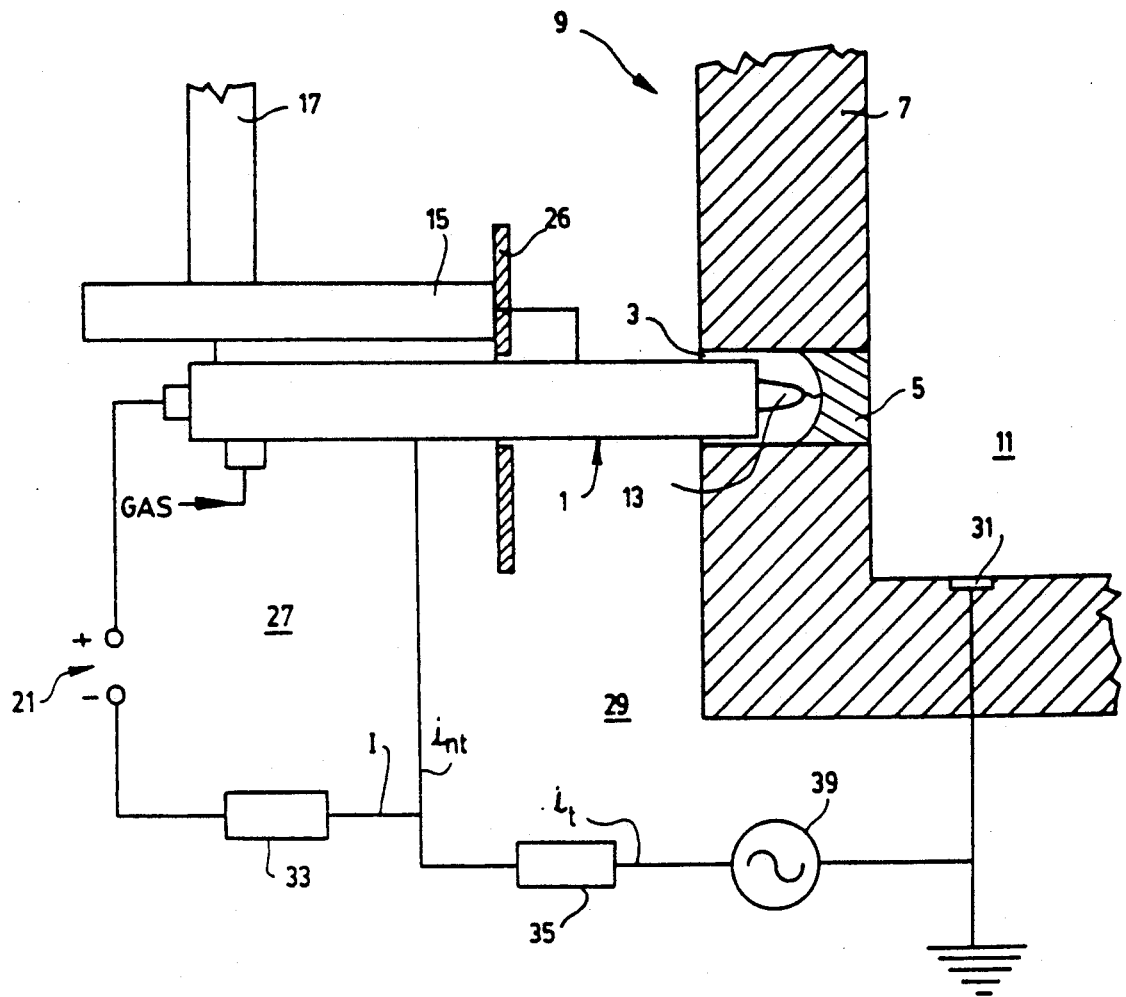
FIG. 7 is a schematic view of a plasma torch according to the invention, working with a superimposed arc generated by an auxiliary source (D.C. or A.C.), which can be the power supply of the furnace, the torch being movable within the hole to open the same.

FIG. 7 shows an other embodiment of the invention, making use of a plasma torch 1 as used in FIGS. 4 and 5 with a superimposed arc. Once again this embodiment is similar to the one of FIG. 4 except that an auxiliary electric power supply 39 is added to superimpose an arc on the arc of the plasma torch 1 between the head of the torch 1 and the plug 5. This auxiliary electric power source 39 may be an alternative current (as is shown) or a direct current; it can even be the standard power supply of the electric furnace.

The way this embodiment is operating similar to the one explained hereinabove with reference to FIG. 5.

Here also, the auxiliary arc current is measured and used to control the displacement of the torch 1 within the hole 3. When the head of the torch is far from the plug, the transferred current $i_t$ flowing through the plug 5 will be null; when the torch 1 is close to the plug, an arc will be generated between the torch 1 and the plug 5 and the transferred current regulated by means of the auxiliary power supply.

In the hybrid mode, the external sleeve of the torch 1 is at a higher potential than the plug 5. Then, the plasma-sprayed ceramic layer deposited on the surface of the sleeve plays an important, electrical insulating role inasmuch as it avoids the arc to strike on this surface and damage the torch. In such a case the plasma flame of the torch 1 gives a preferential path for the auxiliary arc which then remains confined in the region between the front electrode and the plug.

This embodiment using a superimposed arc has the advantage of being easy to automate. Indeed, on the auxiliary power source and when the plug is completely molten, a short circuit will be detected and used to remove quickly the torch 1 from the hole and to end the process.

Figure 8:
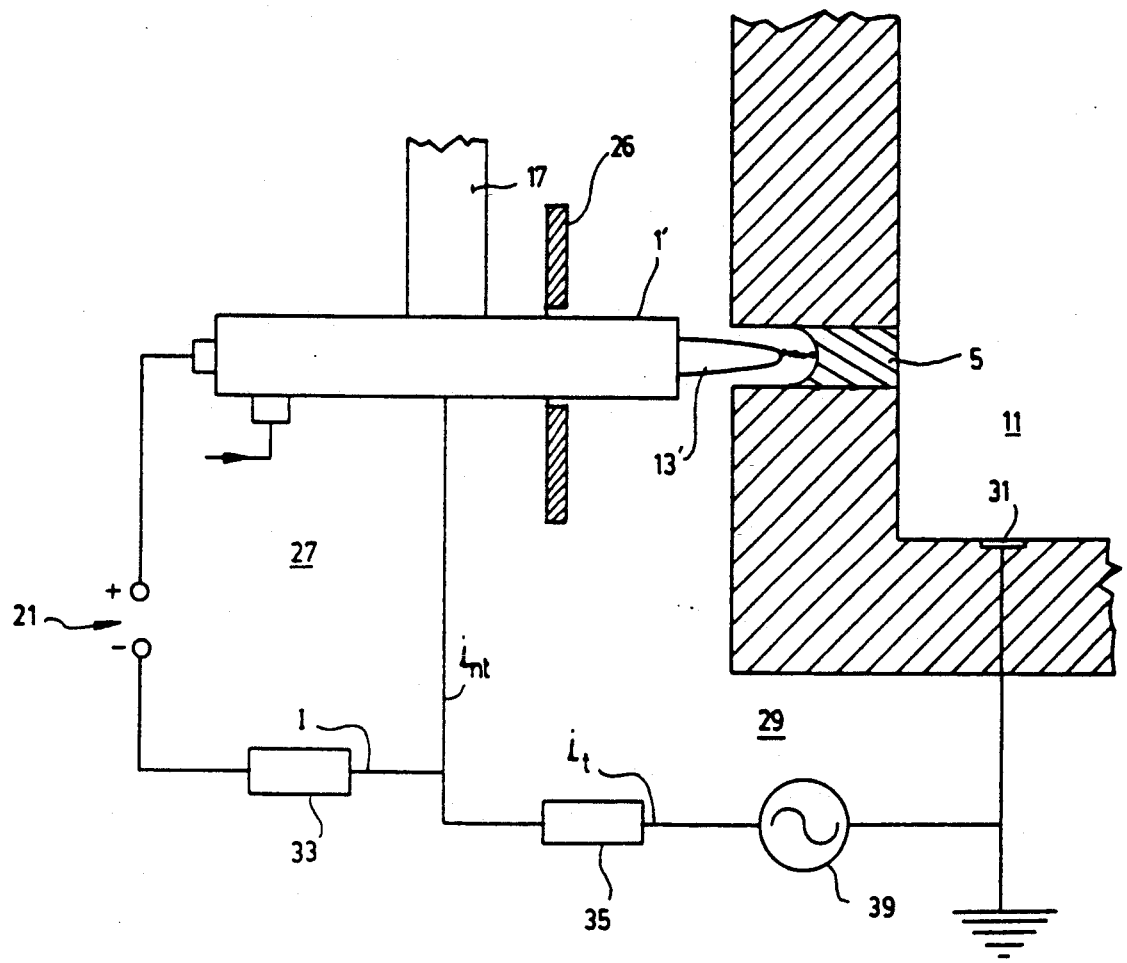
FIG. 8 is a schematic view of a high power plasma torch according to the invention, working with a superimposed arc generated by auxiliary source which can be the power supply of the furnace, the torch being placed in front of the hole and remaining fixed during the process.

FIG. 8 shows the high power plasma torch 1' shown in FIG. 6, used with a superimposition of arc as shown in FIG. 7. In this last embodiment, the electrical circuit comprises a first sub-circuit comprising a direct current power supply 21 for operating the torch, and a second sub-circuit connected to an auxiliary power supply 39 and provided with an electrode 31 in contact with the metal bath. When the plug 5 heated by the plasma flame becomes conductive, an arc is generated between the head of the torch and the plug, which arc is superimposed on the arc of the plasma torch.

The torch 1' is placed in front of the hole and remains fixed during the process. As the plug melts, the molten liquid accumulating in the hole is quickly removed by the high velocity plasma jet. Since the torch 1' remains outside the hole 3, the thermal stress on the head of the torch is limited. Also, as the plug melts, the length of the auxiliary arc increases; then, a mixture of argon and oxygen can be used as plasma gas to lower the voltage of the auxiliary arc.

Of course, other modifications can be made on the various embodiments disclosed hereinabove, without departing from the scope of the present invention as defined in the appended claims.

What is claimed is:

1. A method for opening a tap hole closed by a plug in a wall of a furnace, said method comprising the step of melting and breaking up the plug closing the tap hole by means of a jet of swirling gas of high speed and high temperature generated by a water cooled plasma torch;
   wherein said plasma torch includes a water conduit and the gas that escapes from the tap hole is subjected to constant analysis as the plug melts and breaks up in order to detect the presence of water vapor and thus quickly detect a leak in the water conduit of said plasma torch.

2. A method for opening a tap hole closed by a plug in a wall of a furnace, said method comprising the step of melting and breaking up the plug closing the tap hole by means of a jet of swirling gas of high speed and high temperature generated by a water cooled plasma torch;
   wherein the plug is electrically conductive at high temperature;
   said plasma torch includes a means to generate a superimposed arc between the tip of the plasma torch and the plug; and
   said plasma torch has an electrical circuit including a first sub-circuit connected to a source of direct current for operating the plasma torch in a non-transferred arc mode, and a second sub-circuit including an electrode in contact with the metal in the furnace and at auxiliary electric power source switchable to generate said superimposed arc whenever desired.

3. The method according to claim 2, wherein the current delivered by the auxiliary source is correlated to the position of the torch and used to control its operation and use.

4. The method of claim 2, wherein:
   said plasma torch is a high power torch placed in front of the tap hole and staying fixed during the process;
   the superimposed arc is used and lengthened as the plug melts and breaks up;
   said lengthening of the superimposed arc results in a rise of the voltage in the second sub-circuit; and
   said voltage rise is used to control progress of said method.

5. A method for opening a tap hole closed by a plug in a wall of a furnace, said method comprising the step of melting and breaking up the plug closing the tap hole by means of a jet of swirling gas of high speed and high temperature generated by a water cooled plasma torch; wherein
   the tap hole has a longitudinal axis;
   the plasma torch is coaxially positioned in front of said tap hole and moved axially inside said hole as the plug melts and breaks up;
   the plug is electrically conductive at high temperature;
   said plasma torch is connected to its external power source in such a manner as to operate in both non-transferred and transferred arc modes;
   said external power source is a direct current source; and
   said plasma torch has an electrical circuit that is connected to the direct current source and comprises a first sub-circuit to operate the plasma torch in the non-transferred arc mode and a second sub-circuit including an electrode in contact with the metal in the furnace to operate the plasma torch in the arc transferred mode, the first sub-circuit being provided with a cooled variable resistance to facilitate transfer of the arc onto the plug whenever desired.

6. The method of claim 5, wherein the transferred current is measured when the plasma torch is operated in the arc transferred mode and said transferred current that is indicative of the positions of the torch with respect to the plug, is used to control the movement of the torch and to detect the time when the opening of the tap hole is completed.

7. A method for opening a tap hole closed by a plug in a wall of a furnace, said method comprising the step of melting and breaking up the plug closing the tap hole by means of a jet of swirling gas of high speed and high temperature generated by a water cooled plasma torch; wherein
   the plug is electrically conductive at high temperature;
   the plasma torch is a high power torch placed in front of the tap hole and staying fixed during the process;

said plasma torch is connected to its external power source in such a manner as to operate in both non-transferred and transferred arc modes; and said plasma torch has an electrical circuit including a first sub-circuit connected to the power source which generates a direct current for operating the plasma torch in the non-transferred arc mode, and a second sub-circuit including an electrode in contact with the metal in the furnace to operate the torch in the transferred arc mode, the first sub-circuit being provided with a cooled variable resistance to facilitate transfer of the arc onto the plug, the second sub-circuit including means to detect any transferred current and to activate a switch that automatically disconnects the variable resistance as soon as a transferred current is detected in order to cause the torch then to work in the transferred mode exclusively, with the transferred arc increasing in length as the plug melts and breaks up.

8. The method of claim 7, wherein a supporting gas is added to the plasma gas when the torch operates in the transferred arc mode in order to lower the arc voltage as the length of the arc progressively increases.

9. A method for opening a tap hole closed by a plug in a wall of a furnace, said method comprising the step of melting and breaking up the plug closing the tap hole by means of a jet of swirling gas of high speed and high temperature generated by a water cooled plasma torch, wherein the plasma torch includes a tip;

a hollow sleeve made of stainless steel, said sleeve having an external surface cylindrical in shape, and an open front end;

a pair of front and rear hollow electrodes coaxially mounted in line within said hollow sleeve, the front electrode being positioned at the front end of the torch and being provided with a central through-hole;

an electrically insulating spacing ring coaxially mounted between said hollow electrodes within said hollow sleeves;

means extending within said hollow body for connecting said hollow electrodes to an external electric power source so as to generate between said electrodes an electric arc having an attachment point on each electrode;

means within said hollow sleeve and connectible to an external plasma-gas source having a given range of gas flow rate, for injecting a plasma gas in said electrodes between the same; and water conduit means connectible to an external water flow circuit for directing a flow of cooling water within said hollow sleeve all along the same up to the front end thereof in order to externally cool the front and rear electrodes and the spacing ring and also cool from the inside the external surface of said hollow sleeve;

the plasma torch further comprises a protective covering comprising a layer of ceramic material deposited by plasma spraying onto the external surface of said hollow sleeve;

the front electrode of said plasma torch has a front end provided with a cylindrical rearward portion sized to be fitted into the front end of said hollow sleeve, and a cylindrical forward portion extending across said front end of said hollow sleeve, said cylindrical forward portion forming the tip of said plasma torch and being sized to extend radially and outwardly at a short distance away from the external surface of said hollow sleeve all around the same, whereby, in use, the plasma gas leaving the tap hole is slightly deflected and does not contact the front end of said hollow sleeve;

the central through-hole of the front electrode is sized and shaped to generate a jet of plasma gas of well defined outline and high axial velocity within said given range of gas rate in order to make it sure that the attachment point of the arc on the front electrode is near or at the tip of said plasma torch and the deposition of molten materials on said tip is prevented; and the momentum of the jet is sufficient to melt and break up the plug and simultaneously evacuate the molten materials in a very fast and efficient manner;

a single O-ring is provided at the front end of the torch to water seal the same, said single O-ring extending around the cylindrical rearward portion of the front end of the front electrode; and water channels opening into said water conduit means and forming an integral part thereof, are provided within said hollow sleeve and said rearward portion of the front end of the front electrode, respectively, said channels extending all around said single O-ring inwardly and outwardly thereof, respectively, and thus allowing sufficient cooling of said O-ring to prevent it from being overheated.

10. The method of claim 9, wherein the tap hole has a longitudinal axis and wherein the plasma torch is coaxially positioned in front of said tap hole and moved axially inside said hole as the plug melts and breaks up.

11. The method of claim 10, wherein the movement of the plasma torch inside the tap hole is slow and carried out by steps, the plasma torch being removed from the tap hole after each step to allow plug materials melted inside the hole to drain out of the same and simultaneously avoid excessive overheating inside said hole.

12. The method of claim 11, wherein the plasma torch is mounted on a hydraulically powered linear drive unit positioned near the furnace and adjusted to displace the torch forwards and backwards along the longitudinal axis of the tap hole.

13. The method of claim 12, wherein the linear drive unit is operatively controlled by a computer.

14. The method of claim 12, wherein the linear drive unit is operatively controlled by a programmable automate.

15. The method of claim 12, wherein the difference of temperature between the cooling water entering the plasma torch and the water leaving said torch is measured and this measurement is used to operatively control the linear drive unit.

* * * * *